United States Patent
Chen et al.

(10) Patent No.: US 9,036,861 B2
(45) Date of Patent: *May 19, 2015

(54) METHOD AND SYSTEM FOR REMOTELY INSPECTING BRIDGES AND OTHER STRUCTURES

(71) Applicants: The University of North Carolina at Charlotte, Charlotte, NC (US); Charles G. Boyle, Denver, NC (US)

(72) Inventors: Shen-En Chen, Charlotte, NC (US); Edwin W. Hauser, Charlotte, NC (US); Charles G. Boyle, Denver, NC (US); Meenu Natarajan, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,864

(22) Filed: Feb. 8, 2013

(65) Prior Publication Data

US 2013/0216089 A1 Aug. 22, 2013

Related U.S. Application Data

(63) Continuation-in-part of application No. 13/092,452, filed on Apr. 22, 2011.

(60) Provisional application No. 61/326,828, filed on Apr. 22, 2010, provisional application No. 61/720,691, filed on Oct. 31, 2012.

(51) Int. Cl.
G06T 7/00 (2006.01)

(52) U.S. Cl.
CPC ..... *G06T 7/0002* (2013.01); *G06T 2207/10024* (2013.01); *G06T 2207/10032* (2013.01); *G06T 2207/30184* (2013.01)

(58) Field of Classification Search
CPC .......................................................... G06T 7/00
USPC .......................................................... 382/100
See application file for complete search history.

(56) References Cited

U.S. PATENT DOCUMENTS 7,006,211 B1 * 2/2006 Belew et al. ............... 356/237.1
2001/0043718 A1 * 11/2001 Laumeyer et al. ............ 382/104

(Continued)

OTHER PUBLICATIONS

An Evaluation of Commercially Available Remote Sensors for Assessing Highway Bridge Condition.T. M. Ahlborn, Ph.D., P.E., R. Shuchman Ph.D, L. L. Sutter Ph.D., C. N. Brooks, D. K. Harris, Ph.D., J. W. Burns Ph.D, K. A. Endsley, D. C. Evans, K. Vaghefi, R. C. Oats. Oct. 2010.*

(Continued)

*Primary Examiner* — Stephen R Koziol
*Assistant Examiner* — Delomia Gilliard
(74) *Attorney, Agent, or Firm* — Additon, Higgins & Pendleton, P.A.

(57) ABSTRACT

Spatially Integrated Small-Format Aerial Photography (SFAP) is one aspect of the present invention. It is a low-cost solution for bridge surface imaging and is proposed as a remote bridge inspection technique to supplement current bridge visual inspection. Providing top-down views, the airplanes flying at about 1000 feet can allow visualization of sub-inch (large) cracks and joint openings on bridge decks or highway pavements. On board Global Positioning System (GPS) is used to help geo-reference images collected and facilitate damage detection. Image analysis is performed to identify structural defects such as cracking. A deck condition rating technique based on large crack detection is used to quantify the condition of the existing bridge decks.

6 Claims, 6 Drawing Sheets

(56) References Cited

U.S. PATENT DOCUMENTS

| | | | |
|---|---|---|---|
| 2007/0036432 A1* | 2/2007 | Xu et al. | 382/173 |
| 2008/0050024 A1* | 2/2008 | Aguera Y Arcas | 382/232 |
| 2008/0123994 A1* | 5/2008 | Schultz et al. | 382/284 |
| 2009/0138138 A1* | 5/2009 | Ferren et al. | 701/3 |

OTHER PUBLICATIONS

Unmanned Small-Format Aerial Photography From Kites for Acquiring Large-Scale, High-Resolution, Multiview-Angle Imagery. James S. Aber, Susan W. Aber, and Firooza Pavri. 2002.*

An Automatic Bridge Detection Technique for Multispectral Images. D. Chaudhuri and Ashok Samal. Sep. 2008.*

Creating a Mosaic Using Small Format Aerial Photographs to Nagelhout et al. Jul. 2001.*

An Automatic Bridge Detection Technique for Multispectral Images to Chaudhuri et al. Sep. 2008.*

Integrating Textural and Geometric Information for an Automatic Bridge Detection System to Lomenie et al. 2003.*

Efficient Algorithms for Automatic Detection of Cracks on a Concrete Bridge to Lee et al. 2008.*

* cited by examiner

METHOD AND SYSTEM FOR REMOTELY INSPECTING BRIDGES AND OTHER STRUCTURES

CROSS-REFERENCE TO RELATED APPLICATIONS

This application is a continuation-in-part of, and claims priority to, U.S. application Ser. No. 13/092,452 for Spatially Integrated Aerial Photography for Bridge, Structure, and Environmental Monitoring (filed Apr. 22, 2011, and published Feb. 9, 2012, as Publication No. 2012/0033851 A1), which itself claims priority to U.S. Provisional Patent Application No. 61/326,828 (filed Apr. 22, 2010).

This application further claims priority to U.S. Provisional Patent Application No. 61/720,691 (filed Oct. 31, 2012).

Each of the foregoing patent applications and patent application publication is hereby incorporated by reference in its entirety.

GOVERNMENT SUPPORT

This invention was made with Government support under award number DTOS59-07-H-0005 from the United States Department of Transportation (USDOT). The Government has certain rights in the invention.

FIELD OF THE INVENTION

The invention relates generally to data processing. More specifically, the invention relates to data processing involving the monitoring of highway and railroad bridges and other structures.

BACKGROUND

A nation's transportation infrastructure is crucial to its economic growth and public safety. The function and condition of roads, rails, and ports determine the efficiency of commerce. Bridges are part of the critical transportation infrastructure that can be considered the backbone of a nation's healthy economy. The condition of bridges affects many facets of society, including the efficient movement of people and goods, critical access to communities during emergencies, and a mechanism to overcome physically-challenging environments (e.g., large rivers or valleys). Society often overlooks the importance of maintaining these structures in a manner sufficient to allow them to continue in service for many years into the future.

The importance of bridge safety was brought to the fore when the I-35W Bridge in Minnesota suddenly collapsed in August 2007. Bridges in the United States are facing a crisis of high deterioration rates coupled with a scarcity of maintenance and new construction funding. More than 70 percent of in-service bridges in the United States were built before 1935. For the most heavily used bridges, which are on the interstate highway system, 17 percent were constructed during the 1950s, 44 percent were built during the 1960s, and 20 percent were built during the 1970s. A report published by the American Society of Civil Engineers (ASCE) rated the current state of repair of all infrastructure systems, including highways and bridges, a "D" (ASCE 2009). The report stated that more than a quarter of all bridges are considered either structurally deficient or functionally obsolete.

Federal funds are issued for public bridge maintenance and rehabilitation. Federal funding for surface transportation comes mainly from the Highway Trust Fund (HTF). With the increasing investment needs for national infrastructure improvement, the HTF is facing the problem of a financial deficit. The cumulative gap between federal transportation revenues and investment needs will be roughly $400 billion from 2010-2015. This deficit amount may increase to about $2.3 trillion through 2035. Efficiently allocating the available highway and bridge maintenance and improvement funds will be critical to the future reliability of the nation's transportation infrastructure.

All public bridges in the United States are required to be inspected once every two years. There are presently a number of techniques and procedures available for collecting information and data on a bridge's physical condition. Currently, visual-based inspection represents the primary method for bridge inspection in the United States. Errors caused by visual-based inspection are high, and ratings generated by different inspectors for the same bridge can vary considerably. Furthermore, visual-based inspections tend to be time consuming as the inspector must visit the bridge site, assemble photographic and text-based information, and make a determination regarding the integrity of the structure. There are other types of bridge inspection techniques, such as using nondestructive testing techniques (NDT) for evaluation. All of these techniques, however, are localized, labor intensive, and relatively expensive.

Advanced structural health monitoring (SHM) techniques provide accurate assessment of infrastructure condition and, through the promotion of proper maintenance, can reduce the cost of unnecessary structure replacement. Sensors, such as electromagnetic acoustic transducers, magnetic sensors, laser ultrasonics, infrared or thermal cameras, guided waves, field measurement probes, and strain gauges have been adopted to measure structural information, including static and dynamic displacement, strain and stress, acceleration, surface and interior damage, and corrosion. Due to the sheer size of most bridge structures, however, these SHM techniques may be cost prohibitive.

Remote sensing is a sensing technique that collects information about an object, area, or phenomenon from a distance without physically contacting it. Typically, remote sensing refers to imagery and image information taken by airborne and satellite systems, but ground-based solutions are available as well. For the past fifty years, several Commercial Remote Sensing (CRS) and Spatial Information (SI) technologies for wide-bandwidth spectral information sensing and imaging have been developed integrally with satellite, airborne, and ground-based surveillance platforms, such as IKONOS, Quickbird, OrbView-3, orthotropic and small-format aerial photography, and LiDAR scans. The obvious advantage of using remote sensing for SHM is that it does not require a time-consuming and labor-intensive visit to the site of the structure. CRS-SI applications to structural health monitoring have been extremely limited, however. Among the factors contributing to the limited use of such technologies are lack of guidelines for the use of CRS-SI technologies for bridge management, limited experience with the technology among bridge managers, and difficulties with integrating different kinds of inspection data into a manageable form.

Accordingly, there is a need for a bridge-inspection method based on CRS-SI technology that can have a wide national impact by being practical, scalable, cost-effective, and capable of integration into system-wide implementation.

BRIEF SUMMARY OF THE INVENTION

In one aspect, the invention embraces a computerized method of inspecting a structure (e.g., a bridge or a building)

using aerial photography. An exemplary method includes photographing the structure with a camera (e.g., a digital SLR camera, video camera) having a computer processor connected to a small-format digital image sensor; retrieving multiple images (e.g., still images) of the structure from the camera; creating a composite image of the structure from a combination of the still images; and marking physical attributes of the structure (e.g., cracking) on the composite image.

In another aspect, the invention embraces a computerized system of inspecting a structure using small-format aerial photography (SFAP). An exemplary system includes a camera installed in an aircraft following a flight path that allows the camera to photograph the structure; an image sensor within the camera creating a small-format aerial photograph of the structure; a computer processor receiving the small-format aerial photograph; and software stored on the computer processor for marking physical attributes of the structure.

In yet another aspect, the invention embraces a computerized method of inspecting a structure using aerial photography. An exemplary method includes receiving at least one small-format digital image of the structure created by aerial photography and marking physical attributes of the structure on the image.

Spatially Integrated Small-Format Aerial Photography (SI-SFAP) is another aspect of the present invention. It is a low-cost solution for bridge surface imaging and is proposed as a remote bridge inspection technique to supplement current bridge visual inspection. Providing top-down views, the aircraft flying at about 1000 feet above ground level (AGL) can allow visualization of sub-inch (large) cracks and joint openings on bridge decks or highway pavements. An Onboard Global Positioning System geo-references the images collected, thereby facilitating spatial integration and automated damage detection. A deck condition rating technique based on large crack detection is used to quantify the condition of the existing bridge decks.

The invention is a new process, which is a new use of the existing small-format aerial photography. In one example, the invention uses the integration of a GPS system, software, camera, and special image evaluation algorithms. The invention can also be used to monitor and inspect buildings and other structures as well as monitor environmental conditions such as flooding or weather related damage.

DETAILED DESCRIPTION

Figure 1:
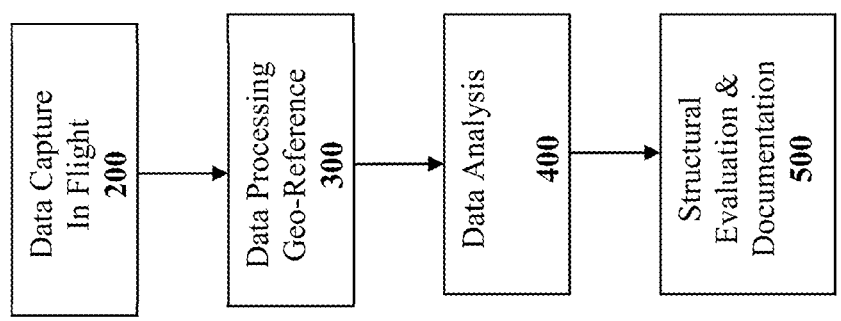
FIG. 1 is a flow chart of an exemplary computerized method of inspecting a structure according to the present invention.

The present invention will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The term "computer" shall mean an electronic device for storing and processing data, typically in binary form, according to instructions given to it in a variable program. A computer may include a desktop computer or a handheld computer such as a laptop, tablet, or smart phone.

* * *

Aerial photography is the original form of remote sensing and remains the most widely used remote sensing method. Typical applications of aerial photography include: geographic mapping, military reconnaissance, environmental studies, and geological explorations. Such photographs are usually taken at high altitudes (e.g., 5000 feet AGL and higher), providing general spatial information such as coordinates, orientations, and colors. For a tool to aid in bridge inspections, however, higher resolution images are needed. A technique known as Small-Format Aerial Photography (SFAP) provides for aerial photographs to be taken at a much lower altitude (e.g., about 1000 feet AGL). With the camera at a much closer position relative to the target, higher resolution images can be captured. In particular, the SFAP technique equips low flying aircraft (e.g., fixed wing aircraft, helicopters, or drones) with professional grade video or photogrammetry equipment that can provide extremely high-resolution photos and videos.

In an exemplary embodiment of the invention, the SI-SFAP of the present invention is developed as a bridge monitoring technology that involves using 1) small airplane, satellite or helicopter, 2) on-board GPS, 3) small-format camera (33-millimeter focal lens), 4) commercial GIS software to geo-reference and stitch the images, and 5) image processing software to quantify crack pattern and identify obstructions and other pertinent information that are associated with bridge and its surrounding conditions. A bridge deck rating algorithm has been devised as a quantifiable indicator for bridge engineers for bridge condition evaluation (described below).

SI-SFAP workflow starts with image capture: The airborne equipment for SI-SFAP involves a low-flying aircraft with onboard GPS and high-end digital camera. Several pre-trip flight planning steps must be carefully performed: The camera should be prepared by ensuring adequate battery charge and a functional, cleared internal data memory card capable of storing the total number of images identified during the Photo Mission Planning (PMP) phase of work; proper camera lens may be required to be installed prior to flight; camera stabilizers may be installed to ensure quality of imagery; the camera may be docked in the underside of the aircraft; GIS software is then used to perform the flight track and photo exposure planning tasks; once the aerial images are being "geo-referenced," they can be delivered to client or can be used for image processing.

The actual execution of the flight track is dependent on many factors to consider from takeoff to landing, including weather and available light, airspace flight restrictions, and Estimated Time of Arrival (ETA) at the bridge site. The goal is to minimize shadows on the bridge deck and achieve the correct camera exposure at the time of the bridge flight. Camera settings may need to be adjusted during progress of the flight to adjust for changes in sun position.

Bridge-deck surface cracking is a common phenomenon. However, with the usual "wear-and-tear" due to frequent traffic issues, the cracking can increase in intensity and lead to eventual potholes, spalling, alligator cracking, major transverse cracking, etc. SI-SFAP can be used to quantify cracking and, more importantly, these high-resolution images can also quantify expansion joint openings for possible movement monitoring. The procedure for cracking deterioration analysis includes: 1) extracting and labeling cracks and 2) measuring crack size (length and average width). After receiving the core aerial image files (e.g., raster images, bitmaps, JPEG files), the process for detecting cracks includes a visual scan inspection of the image file by "zooming" onto sections of the bridge surface. Since the images are comprised of pixels, the crack identification is based on pixel color. Detecting possible cracking can also be completed by looking for crack-like features that branch out as the cracking grows compared to normal smoother pixilated surface features. Expansion joints are easily found between spans of the bridge surfaces, unless patching or pavement of the road has covered the joints to the point where straightforward detection is impossible.

After detecting cracking and expansion joints, further analysis can be compiled to determine structural integrity rating. The crack detection is initially a qualitative result determination, but an indexing procedure transforms this result into quantitative results (Bridge Surface Condition Index (BSCI)).

Several applications of SI-SFAP have been identified:

For project planning, high resolution aerial photography can be used to assess environmental impact potentials and as quantitative tools for project estimations. These applications provide sufficient details to allow project managers to establish specific project scopes. Clear photos from SI-SFAP have also been found to be useful in public presentations, because it provides a strong visual for audience and hence can enhance public relations.

In construction projects, frequent SI-SFAP flyovers would provide temporal recordings of construction processes allowing project management teams to ensure site safety, optimize operation logistics, reduce traffic flow, minimize construction and environmental impacts, and ensure schedule compliance.

As another example of an application of the present invention, high resolution aerial photos can help identify defects and damage causes, and hence are useful in establishing asset conditions and repair prioritization, which in return can optimize rehabilitation design and fiscal planning. At times, SI-SFAP can also be deployed for emergency evaluation operations and planning.

By way of further example, high-resolution imageries can be used to study impacts from surrounding activities near a bridge, including construction blasting and land developments.

* * *

As noted, the invention embraces methods and systems for inspecting a structure. As herein discussed, exemplary methods and systems typically employ an image capture device (e.g., digital camera), a global positioning system device (e.g., GPS receiver), a computer processor (e.g., laptop computer), and an aircraft (e.g., fixed wing aircraft, helicopter, drone, blimp, rocket).

FIG. 1 is a block diagram depicting an exemplary method of inspecting a structure using aerial photography according to the present invention. An exemplary method includes the steps of capturing data in flight 200, processing and geo-referencing the captured data 300, analyzing the data 400, and generating structural evaluation and documentation 500. Capturing data in flight 200 includes the step of configuring aerial photography set-up data 300, which, in turn, includes steps that fall generally into the category of mission planning—selecting a photography technique 20, configuring the camera settings 30, generating a geospatial location plan 40, and creating a flight plan 50. These pre-flight steps are discussed in more detail with respect to FIG. 2.

Upon capture of the data in flight 200, a computer is used to process the data into usable information and to geo-reference the data. Typically, this involves the employment of a geographic information system (GIS) software application capable of digitally creating and manipulating spatial areas. The step of processing and geo-referencing data is discussed in more detail with respect to FIG. 3.

An exemplary method according to the present invention further includes analyzing the data captured during flight 400. Analyzing the data 400 includes the steps of detecting structural problems 90, quantifying structural damage 80, and generating damage diagnostics 70. The step of analyzing the data 400 is discussed in more detail with respect to FIG. 4.

An exemplary method according to the present invention further includes generating a structural evaluation report 500 based on the analysis of the data 400. The structural evaluation report contains the overall findings regarding bridge condition.

Figure 2:
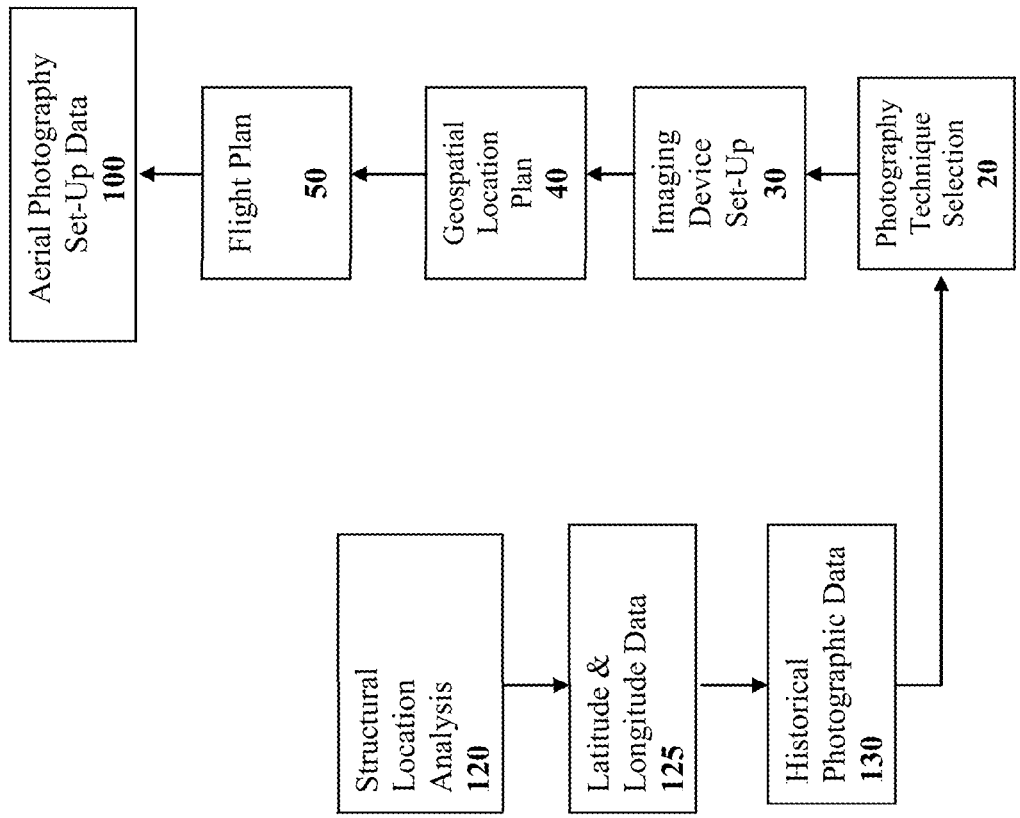
FIG. 2 is a flow chart illustrating the data capture aspect of an exemplary computerized method of inspecting a structure according to the present invention.

Turning now to FIG. 2, the step of capturing data in flight 200 is disclosed in greater detail. To ensure a safe operation and collection of usable data, various pre-trip flight planning and preparations must be performed. The step of capturing data in flight 200 includes selecting a photo delivery technique 115, selecting a photography technique 20, configuring a camera 30 based on the selected photography technique, generating a geospatial location plan 40, and creating a flight plan 50. An advantage of an exemplary method according to the present invention is that it permits the use of digital SLR cameras, as opposed to more expensive specialized aerial photography cameras, due to the lower flight altitude during image acquisition. The step of selecting a photo delivery technique comprises determining whether to store raw image data in JPEG or some other file format, and whether and how to store photo geographic location information (e.g., GPS location data) and/or time information (e.g., when the photo was taken). The step of selecting the appropriate photography technique 20 includes determining the appropriate camera settings (e.g., exposure setting, shutter speed, f-stop, ISO setting, focus setting, image stabilization setting) based on such factors as desired image resolution (e.g., 1-inch ground resolution), time of year (i.e., season) and time of day (i.e., lighting conditions). Configuring the camera 30 includes adjusting the camera settings to account for the appropriate photography technique 20 and placing the camera in the proper position for photo acquisition (e.g., docked on the underside of the aircraft for unrestricted viewing during flight). Creating a geospatial location plan 40 includes determining the correct latitude and longitude coordinates of the bridge (e.g., through analysis of historical orthophotos). Determining the precise location of the bridge aids in the determination of proper photography techniques (e.g., by providing information as to weather, lighting, and physical obstructions at the bridge site) and informs the flight planning process (e.g., by indicating optimal approach path, shortest flight route, etc.) Creating a flight plan 50 includes selecting appropriate aircraft 105 for the mission and planning course and flight instrument settings 108. Typically, the aircraft of choice will be a fixed-wing airplane that is capable of housing a suitable camera mounted on its underside. Typical considerations in planning course and instrument settings 108 include establishing an approach waypoint (e.g., predetermined GPS point), determining appropriate flight control settings (e.g., flaps deployed to control speed), determining altitude and heading settings to ensure a stable flight path, ensuring compliance with appropriate flight regulations (e.g., FAR minimum flight altitudes in congested areas), and establishing a camera fire point to initiate image capture. To achieve the greatest likelihood of obtaining usable image data, the flight plan should be devised to reduce the probability that the image of the structure will be obscured by obstacles, such as traffic, shadows, or foliage. For example, evening flights should be avoided so that lengthy tree shadows will not cover the view of the bridge. Furthermore, rush hour image capture should be avoided to reduce the likelihood that automobile traffic will obscure the image of the structure.

Upon completion of the aforementioned preflight calculations and configurations, the capturing of data 200 is accomplished by executing the flight plan 50 and capturing photographs of the bridge while flying at the designated altitude (typically, about 1000 feet AGL). Accurate tracking over the bridge is accomplished through skilled piloting and use of an onboard GPS device. Because a WAAS-enabled GPS device is only accurate to about ten feet and has delayed positional updating, a remote video camera with aircraft cockpit viewing screen may be installed to facilitate visual acquisition of the targeted structure. The collected images are geo-referenced using GPS technology that is well known to those having ordinary skill in the art. Typically, a GPS receiver and digital camera are attached to a computer processor, though the GPS receiver may be integral to the digital camera.

A GPS reading by a GPS receiver does not always ensure the proper recordation of the exact location of where the image was captured. GPS readings are highly dependent upon the quality of signals received by the GPS unit from available satellites. If the satellite signals deteriorate during any part of the data collection process 200, the same latitude/longitude coordinate might be read and carried over to other points along the deployment route. To enable the proper special integration of the collected images, it is necessary that each GPS reading be attached to a particular image and that it be the exact location of the image. There should not be multiple images associated with the same coordinate. To avoid this problem, the following post-processing algorithm is recommended to ensure that each image has a distinct geographic coordinate. Where images share the same latitude/longitude coordinate, only the first image is considered accurate. Remaining photos with the same coordinates are interpolated and shifted to ensure proper spatial integration.

Figure 3:
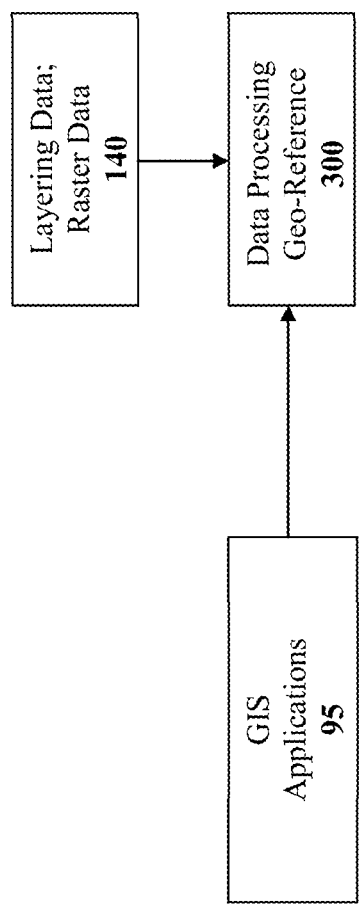
FIG. 3 is a flow chart illustrating the geo-referencing aspect of an exemplary computerized method of inspecting a structure according to the present invention.

Referring now to FIG. 3, the step of processing the geo-referenced data 300 is disclosed in greater detail. After the photo image data has been collected via small-format aerial photography and geo-referenced as previously discussed, the geo-referenced data is processed with an appropriate GIS software application 95. The GIS software application 95 (i.e., geo-referencing tool) links the raw images and GPS coordinates stored during data collection 200 to create a location trail (e.g., where each image is produced). The functionality of the GIS application 95 typically includes the layering of data, including adding images to the proper image layer and linking images to the proper raster layer. Each bridge inspection typically produces many images with their associated GPS data (e.g., longitude and latitude). The data processing by the GIS software application results in the spatial integration of the various photo images of the bridge into a system that permits visualization, management, and analysis of the spatial data using the GIS software application or other application. Typically, spatial integration includes scaling the images to be in proper proportion with each other and with any background images (e.g., raster layer, map), as well as matching and aligning common structures on the composite image and background image.

Figure 4:
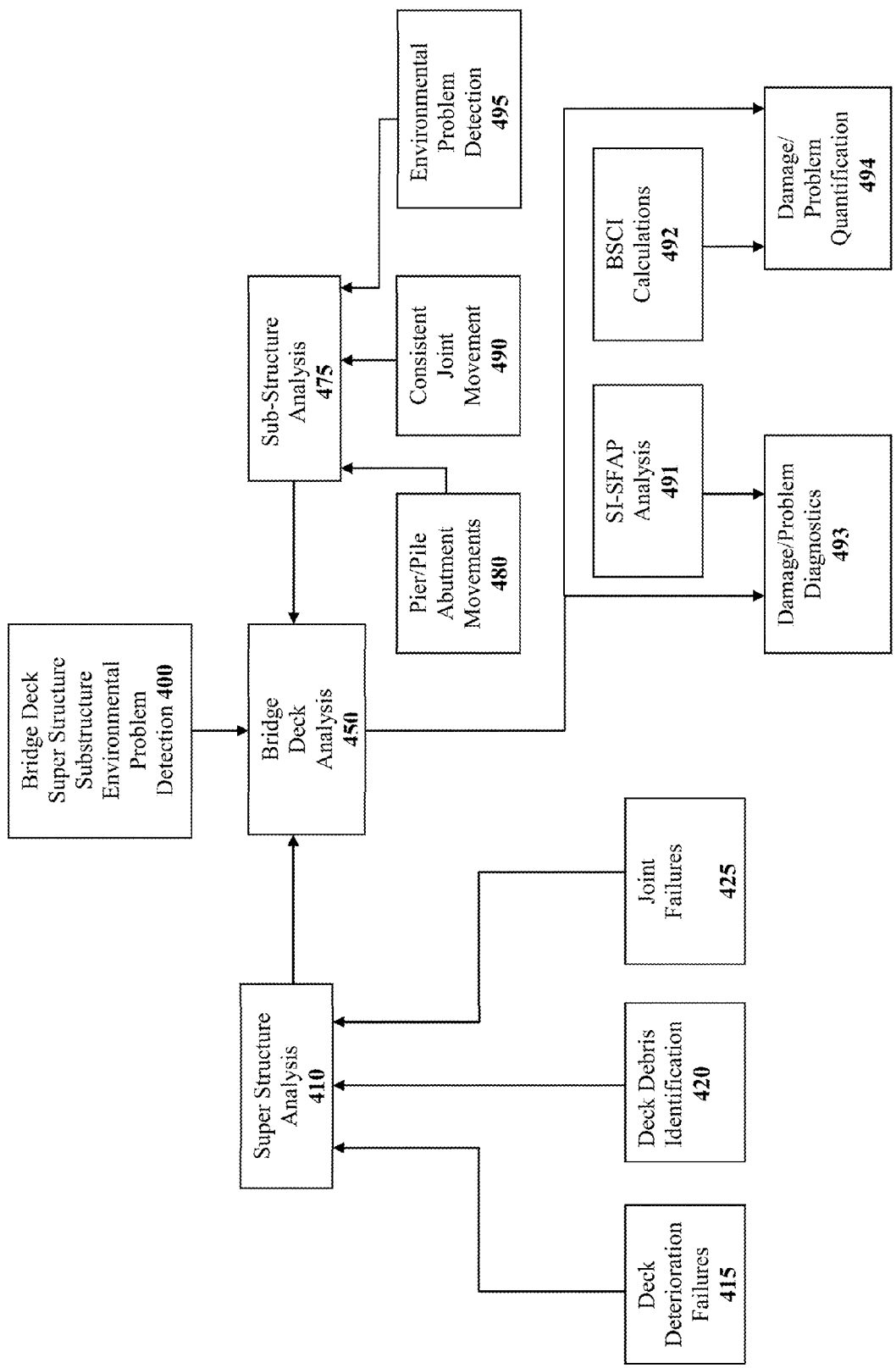
FIG. 4 is a flow chart illustrating the data analysis aspect of an exemplary computerized method of inspecting a structure according to the present invention.

FIG. 4 illustrates the step of analyzing data 400 according to an exemplary embodiment of the present method. The data (e.g., images and GPS information), which has been processed with the geo-referencing tools 300, is analyzed to determine the existence and extent of problems with the bridge deck superstructure, the bridge substructure, and/or problems with the bridge environment (e.g., traffic, flooding) that may be adversely affecting its condition 400. With regard to the analysis of the superstructure 410, the data is analyzed to identify deck deterioration failures 415 (e.g., cracking, spalling, and pot holes), deck debris 420, and joint failures 425. The analysis of the bridge sub-structure 475 seeks to identify movement of piers, piles or abutments 480, consistent joint movement 490, and environmental problems 495 (e.g., damage due to heavy traffic, flooding, efflourescence, mineralization).

The bridge deck analysis 450 for detecting problems with the bridge superstructure, substructure, and environment is accomplished through analysis of the images captured and spatially integrated through SI-SFAP 491. For instance, bridge deck surface cracking is a common phenomenon. With the usual wear-and-tear due to frequent traffic, for example, the cracking often increases in intensity and eventually leads to potholes, spalling, alligator cracking, major traverse cracking, etc. SI-SFAP can be used to quantify cracking and, more importantly, the high resolution images collected from SI-SFAP can quantify the expansion of joint openings for possible movement monitoring. Current bridge inspection reports do not require exact joint-movement measurements. Therefore, the National Bridge Inventory Database is devoid of documentation of bridge superstructure movements. An exemplary method and system according to the present disclosure can establish a temporal record of bridge joint movements. By analyzing temporal data (e.g., images taken across a period of months or years), the temporal movement of a particular bridge can be detected. Bridges observed to have temporal movements outside of expected ranges should typically be flagged for immediate visual inspection.

Figure 5:
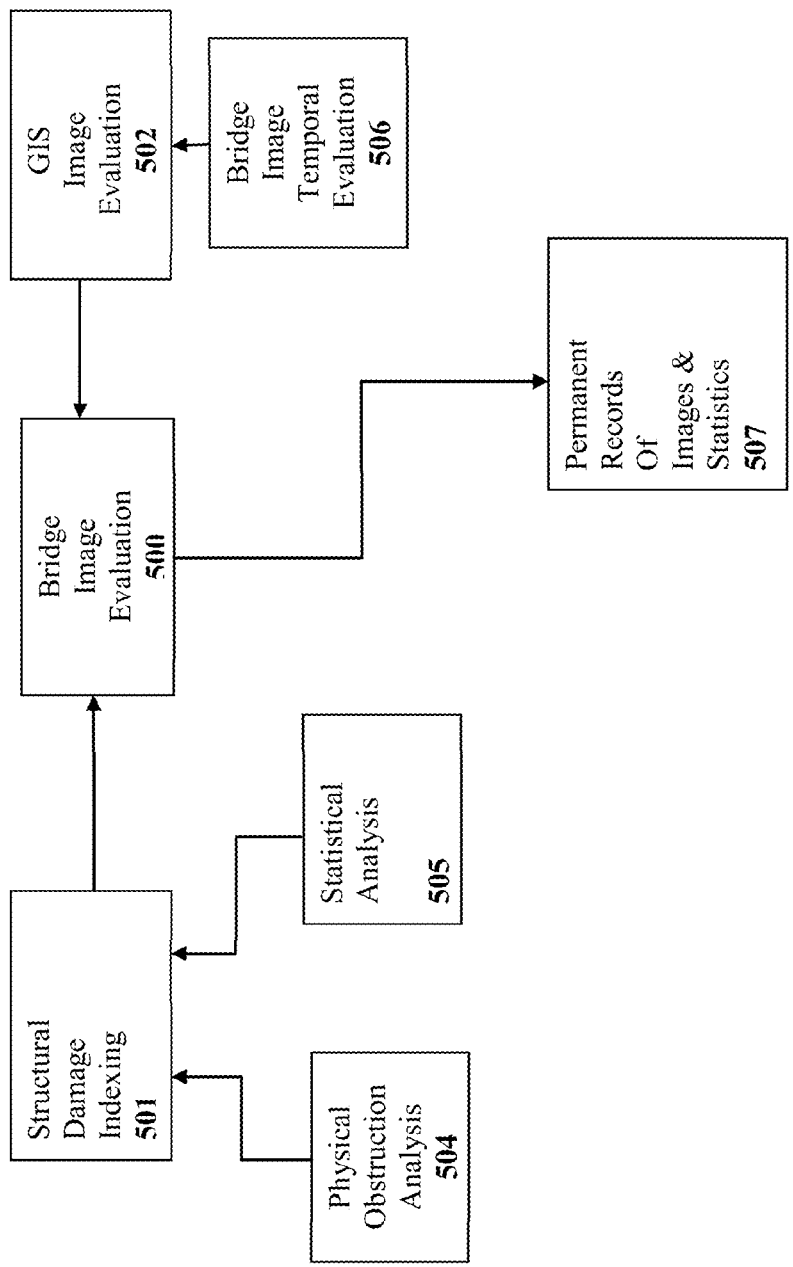
FIG. 5 is a flow chart illustrating the structural evaluation aspect of an exemplary computerized method of inspecting a structure according to the present invention.

Referring now to FIG. 5, the step of evaluating and documenting the structure 500 is disclosed in further detail. The structural evaluation partly depends upon indexing of the structural damage 501. To index the damage, the images must be analyzed to determine the nature and extent of damage. This analysis involves using algorithms to detect areas of damage (e.g., cracking) depicted in the digital photograph.

A digital image is simply a collection of pixels. Each pixel represents some intensity level of red, green, and blue. To a computer, therefore, an image is just a large matrix of intensities. Image processing techniques typically employ information extraction algorithms that can process this matrix and extract specific patterns. This process is usually separated into pattern extraction and pattern classification schemes. With regard to the exemplary method according to the present invention, the patterns of interest are cracks, which are mostly line features. The pattern extraction steps are image enhancement, feature extraction, and feature grouping. The goal of image enhancement 504 is to eliminate excessive noise (e.g., shadows, obstructions) while at the same time enhancing the linear features of a crack in the bridge deck. Image enhancement techniques (e.g., smoothing techniques, histogram equalization techniques) are well known to those having ordinary skill in the art. Upon completion of the image enhancement techniques, feature extraction techniques may be applied to display crack features from the image in a vector format. Feature extraction techniques (e.g., Laplacian edge detection, thinning, and vectorization) are likewise well known to those having ordinary skill in the art. The vectors can then be used to compute crack lengths and orientations, and the vector data may be exported for analysis using various classification or rating schemes (e.g., BSCI 492) that are intended to provide a qualitative or quantitative statistical analysis 505 of bridge condition.

As noted previously, image noise is a particular challenge to the analysis of aerial images. Aerial bridge deck images typically include more noise than, for example, images taken from closer range (e.g., from a truck-mounted camera). Aerial images typically suffer from the introduction of more artifacts (e.g., poor lighting, shadows) and obstructions (e.g., cars, trees). Shadows are typically cast by man-made objects, such as buildings, vehicles, and utility poles and lines. There are three basic kinds of shadows: (1) shadows cast by an object onto a background; (2) shadows cast by an object onto itself; and (3) shadows cast by one object onto another object. Shadows can greatly hinder the effectiveness of image analysis (e.g., pattern detection and classification). Similarly, the variability in shape, dimension, and color of trees and vehicles poses difficulties for image analysis. For example, any tree branch without leaves may appear to be tiny cracks in the bridge. Surface irregularities such as discoloring (e.g., tire marks, repair patches) can likewise interfere with image analysis. Counterintuitively, some artifacts can prove useful in identifying structural damage in captured images. Where shadows obscure a portion of the bridge deck, for example, larger objects such as potholes or patches may still be observed. Identification of such easily-observed objects may facilitate the location of cracks that radiate from them. Because these kinds of analyses are heuristic in nature, they are difficult to incorporate into computer-based procedures.

Figure 6:
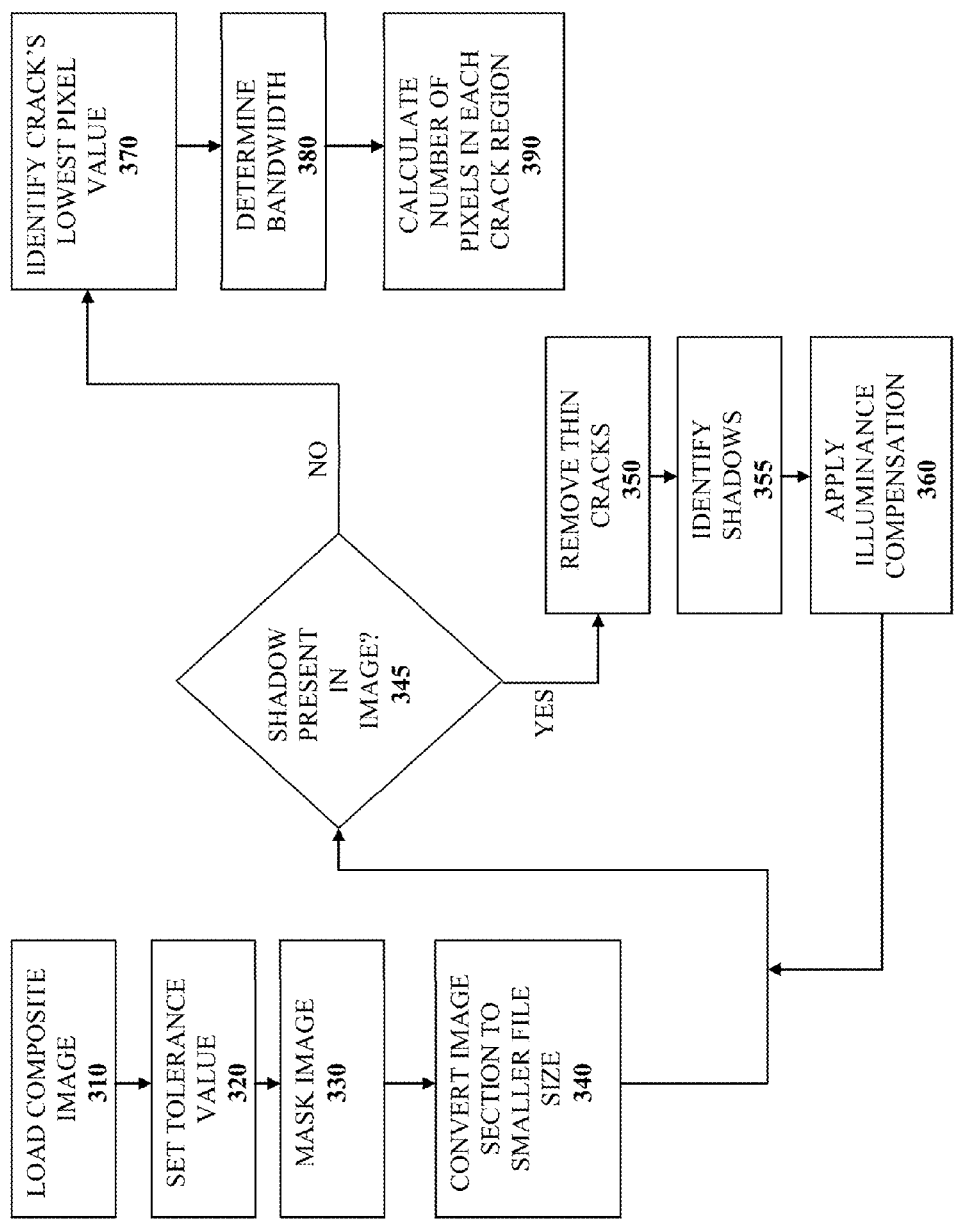
FIG. 6 is a flow chart illustrating the image analysis aspect of an exemplary computerized method of inspecting a structure according to the present invention.

Referring now to FIG. 6, an exemplary method of analyzing images for structural defects is disclosed. The spatially integrated composite image is loaded into the computer processor memory store and is displayed using an appropriate image processing application 310. A tolerance value is set based upon user input 320. (Tolerance value determines how closely to match pixel colors. Higher tolerance values direct the application to match pixels that are farther apart in color.) A portion of the composite image is selected for analysis (e.g., by masking) 330. The selected image section is converted to grayscale to accelerate image processing speed 340. The conversion to grayscale is particularly beneficial given that the composite images are typically very large in file size and place large demands on computer memory during manipulation.

If the image section contains a shadow 345, the shadow region is removed. The shadow region is removed by first cropping the image to remove thin cracks 350, thereby allowing the use of pixel information to identify the shadow region 355 without influence of the crack pixels. The shadows are then removed through illuminance compensation 360, which is a technique well known to those having ordinary skill in the art.

After all shadow areas have been removed, the lowest pixel value corresponding to the crack is identified 370. Any pixel falling within a given bandwidth range from the lowest pixel value is identified as part of a crack. The bandwidth range is determined by user-input tolerance values 380. Each image area representing a crack is then marked (e.g., traced) for visual analysis. The number of pixels in each crack region and along the major axis and minor axis are calculated 390. The length and area of the crack is calculated and displayed. The same approach may be used for distinguishing cracks, spalls, and other stressed regions from structural joints and drainage patterns. Software featuring an artificial intelligence module may be employed to automatically identify and mark relevant physical attributes.

In one embodiment, the marked areas on the image representing the areas of cracking are converted to vector images (e.g., vectorized). Once vectorized, the marked areas can be manipulated (e.g., scaled) without loss of resolution and can be imported into other processes. The vectorized marks can also be layered on the display according to user preferences. For instance, a user could toggle (i.e., on or off) the layers that represent corresponding marked areas of cracking, spalling, water damage (e.g., efflourescence, mineralization), delamination, or joint separation. The selective layering of marked areas allows for greater flexibility in analyzing damaged areas of the structure.

The Bridge Surface Condition Index (BSCI) was formulated to reflect the current Pavement Condition Index. A BSCI rating only considers cracking on the bridge surface and does not differentiate crack types or crack orientations. The BSCI rating process involves the steps of (i) identifying cracks and crack numbers (N) from the aerial images; (ii) determining the area of each bridge span (A) (based on inspection report or original design); (iii) calculating the percentage of crack density (D); (iv) determining deduction value (DV); and (v) subtracting the highest deduction value to get a final rating (BSCI).

The BSCI rating equations are as follows:

$$D = N/A \quad (1)$$

$$DV = 50 \times \log(D) \quad (2)$$

$$BSCI = 100 - \max(DV) \quad (3)$$

where,

D is crack density, A is individual span area, N is number of cracks per span, and DV is deduction value D=Density (number of cracks per bridge deck)×100

V=Deduction Value (log)

Widespread use of an indexing system for bridge inspection, such as the BSCI, would increase standardization. When coupled with the computerized crack detection techniques (e.g., using image processing software), the BSCI can greatly reduce inconsistencies in structural reports that are inherent in the subjectivity of the currently predominant visual-based inspection system.

Upon completion of the quantitative and qualitative evaluations, the spatially integrated images, the results of the statistical analyses (e.g., number of cracks), and the qualitative analysis (e.g., indexing, BSCI) are stored for future reference. Storage of this information can facilitate tracking of historical changes in the bridge structure, and can aid in investigation of factors contributing to bridge failure and deterioration.

\* \* \*

To supplement the present disclosure, this application incorporates entirely by reference the following documents:

AASHTO. 1980. Guide for bridge maintenance management. American Association of State Highway and Transportation Officials, Washington, D.C.

AASHTO. 1987. Manual for bridge maintenance. American Association of State Highway and Transportation Officials, Washington, D.C.

AASHTO. 1994. A policy on geometric design of highways and streets. American Association of State Highway and Transportation Officials, Washington, D.C., 559.

Abdalla M. 2004. 3GR for Road Safety Integration of GIS, GPS, GSM and Remote Sensing, for Road Safety. Proceedings of the Eighth International Conference, Beijing, China.

Abdel-Qader I, O Abudayyeh, M ASCE, ME Kelly. 2003. Analysis of edge-detection techniques for crack identification in bridges. Journal of Computing in Civil Engineering 17(4): 255-263.

Abdel-Qader I, S Pashaie-Rad, O Abudayyeh, S Yehia. 2006. PCA-Based algorithm for unsupervised bridge crack detection. Advances in Engineering Software 37: 771-778.

Abudayyeh O, M A Bataineh, I Abdel-Qader. 2004. An imaging data model for concrete bridge inspection. Advances in Engineering Software 35(8-9): 473-480.

ACE. 2003. Engineering and design remote sensing. Department of the Army, US Army Corps of Engineers, Washington, D.C.

Achenbach J D. 2009. Structural health monitoring-what is the prescription. Mechanics Research Communications 36(12): 137-142.

AGA. 2007. Costs Less, Lasts Longer. American Galvanizers Association. <http://www.galvanizeit.org/images/uploads/publicationPDFs/CLLL.pdf>. (Accessed Nov. 6 2009).

Ahn Y, P Shanmugam, J H Ryu, J C Jeong. 2006. Satellite detection of harmful algal bloom occurrences in Korean waters. Harmful Algae 5(2): 213-231.

Alaylioglu H and A Alaylioglu. 1997. Dynamic structural assessment of a highway bridge via hybrid FE model and in situ testing. Computers & Structures 63(3): 439-453.

Al-Qadi I L and S Lahouar. 2004. Ground penetrating radar: State of the practice for pavement assessment. Materials Evaluation 62(7): 759-763.

Al-Qadi I L and S Lahouar. 2005. Measuring rebar cover depth in rigid pavements with ground-penetrating radar. Transportation Research Record 1907: 81-85.

Amekudzi A A and R Baffour. 2002. Using Remote Sensing, Image Processing and GIS Techniques for Transportation Infrastructure and Environmental Capital Asset Management.

ASCE. 2002. Proceedings of the Seventh International Conference on Applications of Advanced Technology in Transportation, Boston Marriot, Cambridge, Mass.

Anon. 1989. How to maintain local bridges at the least cost. Better Roads 59(5): 29-30.

ASCE. 2005. Report Card for America's Infrastructure-Bridges [C]. America Society of Civil Engineering.

ASCE. 2009. Infrastructure report card 2009. American Society of Civil Engineering.

ASCE/SEI-AASHTO. 2009. White Paper on Bridge Inspection and Rating. Journal of Bridge Engineering 14(1): 1-5.

ASTM. 1997. Standard test methods for measuring and compensating for emissivity using infrared imaging radiometers. American Society for Testing and Materials, E 1862-97R02E01, Pennsylvania, USA.

ASTM. 2000. Standard specification for carbon and high-strength low-alloy structural steel shapes, plates, and bars and quenched-and-tempered alloy structural steel plates for bridges. American Society for Testing and Materials.

Ataei S, A A Aghakouchak, M S Marefat, S Mohammadzadeh. 2005. Sensor fusion of a railway bridge load test using neural network. Expert Systems with Applications 29: 678-683.

Au T. 1963. Elementary structural mechanics, Prentice Hall, Englewood Cliffs, N.J.: 368-377.

Avdelidis N P, A Moropoulou, D P Almond. 2004. Passive and active thermal nondestructive imaging of materials. Electro-Optical and Infrared Systems: Technology and Applications, London, United Kingdom: 126-140.

Baba N and K Ono. 1987. Design and construction of a long span, wide trussed langer girder bridge. Annual Report of Roads: 29-42.

Benson R C. 2000. Overview of geophysical and non-destructive methods for characterization of roads and bridges. GeoDenver 2000: Use of Geophysical Methods in Construction, Denver, Colo., USA.

Better Road. 2009. <http://obr.gcnpublishing.com/articles/may03c.htm>. (Accessed Apr. 12, 2009).

Birge S L. 1985. Highway dimensions from photolog. Technical Papers, 51st Annual Meeting, ASP-ACSM Convention: Theodolite to Satellite: 29-38.

Birk R J, T Stanley, G I Snyder, T A Hennig, M M Fladeland, F Policelli. 2003. Government programs for research and operational uses of commercial remote sensing data. Remote Sensing of Environment 88: 3-16.

Biswas P. 2004. Implement ability of the WDBN remote system for bridge integrity monitoring at the county level. Master Thesis, The University of Alabama at Birmingham, Birmingham, Ala.

Bosch T, S Pavageau, D D'Alessandro, N Servagent, V Annovazzi-Lodi, S Donati. 2001. A low-cost, optical feedback LiDAR range-finder with chirp-control. Instrumentation and Measurement Technology Conference. Proceedings of the 18th IEEE 2: 1070-1074.

Brent R J. 1996. Applied Cost-Benefit Analysis. Edward Elgar, Cheltenham and Lyme: 3-6.

Brinckerhoff P. 1993. Bridge Inspection and Rehabilitation: A Practical Guide. Wiley-IEEE, New York, Chapter 1: 1-11.

Brown C J and G W Roberts. 2008. Monitoring infrastructure using global navigation satellite systems. Insight: Non-Destructive Testing and Condition Monitoring 50(10): 570-571.

Burleigh D and R Bohner. 1999. Thermal nondestructive testing (TNDT) of adhesively bonded composite reinforcements applied to concrete civil structures. Part of SPIE Conference on Nondestructive Evaluation of Bridges and Highways III, SPIE, 3587, Newport Beach, Calif.

Butenuth M, B M Straub, C Heipke, F Willrich. 2003. Tree supported road extraction from arial images using global and local context knowledge. Computer Vision System—Lecture Notes in Computer Science 2626/2003: 162-171.

Caceres J J and K C Slatton. 2007. Improved classification of building infrastructure from airborne Lidar data using spin images and fusion with ground-based Lidar. Urban Remote Sensing Joint Event, Paris, France.

Cai H and W Rasdorf. 2008. Modeling road centerlines and predicting lengths in 3-D using LIDAR point cloud and planimetric road centerline data. Computer-Aided Civil and Infrastructure Engineering 23(3): 157-173.

Carrara W G, R S Goodman, R M Majewski. 1995. Spotlight synthetic aperture radar. Artech House, Boston, London.

CCRS. 2009. Fundamentals of remote sensing. Canada Centre for Remote Sensing. <http://www.ccrs.nrcan.gc.ca/resource/tutor/fundam/pdf/fundamentals_e.pdf>. (Accessed Nov. 6, 2009).

Chan T H T, Z X Li, J M Ko. 2001. Fatigue analysis and life prediction of bridges with structural health monitoring data—Part II: application. International Journal of Fatigue 23(1): 55-64.

Chase S B. 2005. The role of sensing and measurement in achieving FHWA's strategic vision. Sensing Issues in Civil Structure Health Monitoring: 23-32.

Chase S B and G Washer. 1997. Non-Destructive evaluation for bridge management in the next century. Public Roads 61(1).

Chaudhuri D and A Samal. 2008. An automatic bridge detection technique for multispectral images. IEEE Transactions on Geoscience and Remote Sensing 46(9): 2720-2727.

Chen S, et al. 2007. IRSV System for Transportation Infrastructure Operations and Management. Quarterly Report. USDOT-RITA.

Chen S, E Hauser, R Eguchi, W Liu, C Rice, Z Hu, C Boyle, H Chung. 2009. Bridge Health Monitoring Using Commercial Remote Sensing. Proceeding of the 7th International Workshop on Structural Health Monitoring, Stanford, Calif.

Chona R, S K Khanna, K J Kmiec. 1995. Application of high resolution geometric Moire method to fracture problems. Experimental Techniques 19(6): 10-13.

Chung HC and M Shinozuka. 2004. Highway surface distress inspection using remote sensing. Engineering, Construction, and Operations in Challenging Environments: Earth & Space 2004, ASCE: 231-238.

Clark M R, D M McCann, M C Forde. 2003. Application of infrared thermography to the non-destructive testing of concrete and masonry bridges. NDT & E International 36: 265-275.

Consolazio G R and D R Cowan. 2003. Nonlinear analysis of barge crush behavior and its relationship to impact resistant bridge design. Computers & Structures 81(8-11): 547-557.

Corrosion Doctors. Silver Bridge Collapse. <http://www-.corrosion-doctors.org/Bridges/Silver-Bridge.htm>. (Accessed Nov. 6, 2009).

Czepiel E. 1995. Bridge Management Systems Literature Review and Search. ITI Technical Report, No. 11, Northwestern University BIRL Industrial Research Laboratory.

Dawson M and H Shenton. 2005. Evaluation of Steel Bridge Girders Damaged by over-height Vehicle Collision. A worksheet submitted to NSF-REU, <http://www.gogetpapers.com/Essays/AASHTO_design_standards/5>. (Accessed Nov. 6, 2009).

DigitalGlobe. 2009. <http://www.digitalglobe.com/index-.php/82/Content+Collection+Systems>. (Accessed Nov. 6, 2009).

Dunker K F and B G Rabbat. 1990. Performance of highway bridges. Concrete International 12(8): 40-42.

Dutta A and S Talukdar. 2004. Damage detection in bridges using accurate modal parameters. Finite Elements in Analysis and Design 40: 287-304.

Eguchi R T, M Eeri, B Mansouri. 2005. Use of Remote Sensing Technologies for Building Damage Assessment after the 2003 Bam, Iran, Earthquake—Preface to Remote Sensing Papers. Earthquake Spectra 21(S1): S207-S212.

Eihoz M. 2006. Use of GIS technique as decision support tool for sanitary landfill sitting. Solid Waste Technology and Management: 521-530.

Faber M H, D V Val, M G Stewart. 2000. Proof load testing for bridge assessment and upgrading. Engineer Structures 22(12): 1677-1689.

Faro Technology. 2007. FARO Laser Scanner LS 840/880.

FHWA. 2002. Bridge Inspector's Reference Manual. Federal Highway Administration, U.S. Department of Transportation, No. FHWA NHI 03-002.

FHWA. 2005. National Bridge Inspection Standard. Federal Highway Administration. U.S. Department of Transportation, No. FHWA-2001-8954.

Felkel J P, D C Rizos, P H Ziehl. 2007. Structural performance and design evaluation of HPS 70W bridge girders. J. Constructional Steel Res. v63: 909-921.

Filho J N O, Y Y Su, H Song, L Y Liu, Y M A Hashash. 2005. Field tests of 3D laser scanning in urban excavation. International Conference on Computing in Civil Engineering, ASCE, Cancun, Mexico.

Frýba L and M Pirner. 2001. Load tests and modal analysis of bridges. Engineering Structures 23(1): 102-109.

Forzieri G, M Gardenti, F Caparrini, F Castelli. 2008. A methodology for the pre-selection of suitable sites for surface and underground small dams in arid areas: A case study in the region of Kidal, Mali. Physics and Chemistry of the Earth, Parts A/B/C 33(1-2): 74-85.

Fratini M, M Pieraccini, D Dei, F Parrini, G Bartoli, C Atzeni. 2007. An experimental comparison of Interferometric radar vs. accelerometers for monitoring of large structures. 4th European Radar Conference, EURAD, Munich, Germany: 99-102.

Fuchs P A, G A Washer, S B Chase, M Moore. 2004a. Application of Laser-Based Instrumentation for Highway Bridges. Journal of Bridge Engineering 9(6): 541-549.

Fuchs P A, G A Washer, S B Chase, M Moore. 2004b. Laser-based Instrumentation for Bridge Load testing. Journal of Performance of constructed facilities 18(4): 213-219.

Fu C C, J R Burhouse, G L Chang. 2004. Overheight vehicle collisions with highway bridges. Transportation Research Record (TRB) No. 1865: 80-88.

Gafy M E and Y Abdelrazig. 2004. Remote Sensing Framework for Transportation Infrastructure Environment Assessment. Proceedings of the Ninth Biennial ASCE Aerospace Division International Conference on Engineering, Construction, and Operations in Challenging Environments. League City/Houston, Tex.

Gentile C and N Gallino. 2008. Ambient vibration testing and structural evaluation of an historic suspension footbridge. Advances in Engineering Software 39(4): 356-366.

GeoEye. 2009. <http://www.geoeye.com/CorpSite/corporate/>. (Accessed Nov. 6, 2009).

Ghose M K, A K Dikshit, SK Sharma. 2006. A GIS-based transportation model for solid waste disposal—a case study on Asansol municipality. Waste Management 26: 1287-1293.

Girardeau-Montaut D, M Roux, R Marc, G Thibault. 2005. Change detection on points cloud data acquired with a ground laser scanner. Workshop "Laser scanning 2005", Enschede, the Netherlands.

Glantz P, ED Nilsson, W Hoyningen-Huene. 2009 Estimating a relationship between aerosol optical thickness and surface wind speed over the ocean. Atmospheric Research 92(1): 58-68.

Glennie C. 2007. A kinematic terrestrial LIDAR scanning system. 20th International Technical Meeting of the Satellite Division of The Institute of Navigation 2007, ION GNSS 2007, Fort Worth, Tex., United states.

Google Earth. <http://earth.google.com/>. (Accessed Nov. 6, 2009).

Grivas D A, B C Schultz, G Mason. 1997. A framework for using satellite and airborne remote sensing technology in infrastructure performance assessment. Proceedings of the 1997 Speciality Conference on Infrastructure Condition Assessment: Art, Science, Practice, ASCE, Boston, Mass., USA.

Guralnick S A and E S Suen. 1991. Real-time inspection of pavement by Moire patterns. Applications of Optical Engineering: Proceedings of OE/Midwest '90, Rosemont, Ill., USA: 664-677.

Han Y, H Zheng, Q Cao, Y Wang. 2007. An effective method for bridge detection from satellite imagery. 2nd IEEE Conference on Industrial Electronics and Applications, Harbin, China: 2753-2757.

Harik I E, A M Shaaban, H Gesund, G Y S Valli and S T Wang. 1990. United States bridge failures 1951-1988. Journal of performance of constructed facilities 4(4): 272-77.

Hassan M, O Burdet, R Favre. 1995. Ultrasonic measurements and static load tests in bridge evaluation. NDT & E International 28(6): 331-337.

Herold M, D A Roberts, M E Gardner, P E Dennison. 2004. Spectrometry for urban area remote sensing—Development and analysis of a spectral library from 350 to 2400 nm. Remote Sensing of Environment 91(3-4): 304-319.

Herold M and D Roberts. 2005. Spectral characteristics of asphalt road aging and deterioration: Implications for remote-sensing applications. Applied Optics 44(20): 4327-4334.

Herold M, ME Gardner, V Noronha, A Dar, DA Roberts. 2006. Pectrometry and hyperspectral remote sensing of urban road infrastructure. Online journal of space communication. <http://satjournal.tcom.ohiou.edu/Issue03/abst_herold.html>. (Accessed May 6, 2009).

Hinz S and A Baumgartner. 2000. Road extraction in urban areas supported by context objects. International Archives of Photogrammetry and Remote Sensing 33(B3/1): 405-412.

Hinz S and A Baumgartner. 2003. Automatic Extraction of Urban Road Networks from Multi-View Aerial Imagery. ISPRS Journal of Photogrammetry and Remote Sensing 58(1-2): 83-98.

Horberry T, M Halliday, A G Gale. 2002. Bridge strike reduction: optimizing the design of markings Accident Analysis & Prevention 34: 581-588.

Hite M C, R Desroches, R T Leon. 2006. Evaluation of the performance of bridge steel pedestals under seismic loads. Structures Congress 2006, St. Louis, Mo., United States: 171.

Huertas A and R Nevatia. 2000. Detecting changes in aerial views of manmade structures. Image Vis. Comput. 18(8): 583-596.

Huston D R. 1999. Ground penetrating radar for concrete bridge health monitoring applications. Proceedings of 1999 Nondestructive Evaluation of Bridges and Highways III 3587: 170-179.

Idriss R L, K R White, S P Chang. 1995. Evaluation and testing of a fracture critical bridge. NDT & E International 28(6): 339-347.

INRS. 2009. Low cost high-precision LiDAR range finder (LRF). Institut national de la recherché scientifique.

InSiteful Imagery. 2007. <http://www.insiteful-imagery.com/about.htm>. (Accessed May 6, 2009).

Jandu A S. Inspection and Maintenance of Highway Structures in England. Bridge Engineering 161 (BE3): 111-114.

Jelalian A V. 1992. Laser radar systems. Artech House, Boston, London.

Jensen J and D Cowen. 1999. Remote sensing of Urban/Suburban infrastructure and socio-economic attributes. Photogrammetric Engineering & Remote Sensing 65(5): 611-622.

Jiang J J, X Z Lu, J Q Guo. 2002. Study for real-time monitoring of large-span bridge using GPS. Progress in Safety Science and Technology, Taiwan, China: 308-312.

Jiang R, D V Jáuregui, and K White. 2008. Close-range photogrammetry applications in bridge measurements: literature review. Measurement 41: 823-834.

Jivacate I and F T Najafi. 2003. The Current Status of Bridge Management Systems. Proceedings of Canadian Society for Civil Engineering Annual Conference, Moncton, NB, Canada: 1622-1631.

Kayen R, R T Pack, J Bay, S Sugimoto, H Tanaka. 2006. Terrestrial-LIDAR visualization of surface and structural deformations of the 2004 Niigata Ken Chuetsu, Japan, earthquake. Earthquake Spectra 22(S1): 5147-5162.

Keskinen A. 2007. Mapping road infrastructure in developing countries applying remote sensing and GIS—The case of the Taita Hills, Kenya. Master Volume, Department of Geography. Helsinki, University of Helsinki Kim K H, J H Lee, B G Lee. 1997. Congestion data acquisition using high resolution satellite imagery and frequency analysis techniques. International Geoscience and Remote Sensing Symposium (IGARSS), Singapore: 331-334.

Klowak C, A Memon, A Mufti. 2006. Static and fatigue investigation of second generation steel-free bridge decks. Cement and Concrete Composites 28(10): 890-897.

Klowak C S and A A Mufti. 2009. Behaviour of bridge deck cantilever overhangs subjected to a static and fatigue concentrated load. Construction and Building Materials 23(4): 1653-1664.

Ko J M and Y Q Ni. 2005. Technology developments in structural health monitoring of large-scale bridges. Engineering Structures 27: 1715-1725.

Lee J J and M Shinozuka. 2006. A vision-based system for remote sensing of bridge displacement. NDT & E International 39(5): 425-431.

Lefevre R J. 2000. Radar bridge clearance sensor. IEEE 2000 International Radar Conference, Alexandria, Va., USA, 660-665.

Lichti D D and S J Gordon. 2004. Error propagation in directly georeferenced terrestrial laser scanner point clouds for cultural heritage recording. WSA2 Modeling and Visualization, Athens, Greece.

Liu M and D M Frangopol. 2004. Optimal bridge maintenance planning based on probabilistic performance prediction. Engineering Structures 26(7): 991-1002.

Liu W, S Chen, E Hauser. 2009. Remote sensing for bridge health monitoring. SPIE Optics+Photonics, San Diego, Calif., No. 7456-13.

Lomenie N, J Barbeau, R Trias-Sanz. 2003. Integrating textural and geometric information for an automatic bridge detection system. 2003 IGARSS: Learning From Earth's Shapes and Colours, Toulouse, France: 3952-3954.

Luo Y, Y Xue, S B Zhong. 2005. Road extraction from IKONOS image using Grid computing platform. International Geoscience and Remote Sensing Symposium (IGARSS), Seoul, South Korea IEEE.

Lwin M M. 2006. The important roles of bridge maintenance and management on transportation safety and efficiency. Proceedings of the 3rd International Conference on Bridge Maintenance, Safety and Management—Bridge Maintenance, Safety, Management, Life-Cycle Performance and Cost. Washington, D.C.: 47-51.

Maser K R. 1995. Evaluation of bridge decks and pavements at highway speed using ground-penetrating radar. Nondestructive Evaluation of Aging Bridges and Highways, SPIE, Oakland, Calif., USA.

Merkle W J and J J Myers. 2006. Load testing and load distribution response of Missouri bridges retrofitted with various FRP systems using a non-contact optical measurement system. Transportation Research Board 85th Annual meeting, Washington, D.C.

Mertz D R. 2001. Trends in design and construction of steel highway bridges in the United States. Prog. Struct. Engrg, Mater v3: 5-12.

Miceli M, J Duke, M Horne. 2003. Thermal infrared inspection of FRP bridge decks for health monitoring. Thermosense XXV 5073: 328-338.

Morain S A. 2002. Critical Infrastructure Protection Using Image Intelligence from Space-based and Aerial Sensors. ASME International Mechanical Engineering Congress and Exposition, New Orleans, La.: 159-168.

Moropoulou A. 2002. Infrared thermography and ground penetrating radar for airport pavements assessment. Nondestructive Testing and Evaluation 18(1): 37-42.

Moulton L K, H GangaRao, G T Halvorsen. 1985. Tolerable movement criteria for highway bridges. U.S. Department of Transportation, Federal Highway Administration, No. FHWA-RD-85-107. McLean, Va.

Nassif H H, M Gindy, J. Davis. 2005. Comparison of LiDAR Doppler vibrometer with contact sensors for monitoring bridge deflection and vibration. NDT & E International 38(3): 213-218.

NCDOT. 2000. Bridge policy. North Carolina Department of Transportation: Highway Design Branch/Design Services Unit. <http://www.ncdot.org/doh/preconstruct/altern/value/manuals>. (Accessed Nov. 6, 2009).

NCDOT. 2007. NC Bridge Information. North Carolina Department of Transportation. <http://www.ncdot.org/doh/operations/dp_chief_eng/maintenance/bridge/>. (Accessed Apr. 12, 2009).

NCHRP (National Cooperative Highway Research Program). 1998. Manual for Bridge Rating Through Load Testing. Research Result Digest 234, Transportation Research Board, Washington, D.C.

NCDOT TSG. 2007. Annual Average Daily Traffic Volume-2007 spreadsheet. Traffic Survey Group. <http://www.ncdot.org/doh/preconstruct/tpb/traffic_survey/>. (Accessed Nov. 6, 2009).

NCRST. 2000. National Consortia on Remote Sensing in Transportation. <http://www.ncgia.ucsb.edu/ncrst/research/ncgia.html>. (Accessed Nov. 6, 2009).

Neves L C, D M Frangopol, P J S Cruz. 2006. Multi-Objective Probabilistic Optimization of Bridge Lifetime Maintenance: Novel Approach. Proceedings of the 3rd International Conference on Bridge Maintenance, Safety and Management—Bridge Maintenance, Safety, Management, Life-Cycle Performance and Cost, Washington, D.C.: 539-541

Nowak A S, S Kim, P R Stankiewicz. 2000. Analysis and diagnostic testing of a bridge. Computers & Structures 77(1): 91-100.

NSTPRSC. 2007. Transportation for Tomorrow: Report of the National Surface Transportation Policy and Revenue Study Commission. National Surface Transportation Policy and Revenue Study Commission.

NSTIFC. 2009. Paying Our Way. Report of the National Surface Transportation Infrastructure Financing Commission, National Surface Transportation Infrastructure Financing Commission.

Orban Z and M Gutermann. 2009. Assessment of masonry arch railway bridges using non-destructive in-situ testing methods. Engineering Structures 31(10): 2287-2298.

OMB. 2009. Budget assumptions, OMB Circular No. A-94. Office of Management and Budget. <http://www.whitehouse.gov/omb/circulars/a094/a94_appx-c.html>. (Accessed Nov. 6, 2009).

Owen E. Montreal bridge collapse: design and inspection criticized. <www.nce.co.uk/ . . . /196733.article>. (Accessed Apr. 12, 2009).

Papaelias M P, C Roberts, C L Davis. 2008. A review on non-destructive evaluation of rails: state-of-the-art and future development. Proceedings of the Institution of Mechanical Engineers, Part F: Journal of Rail and Rapid Transit 222: 367-384.

Parcharidis I, M Foumelis, P Kourkouli, U Wegmuller, E Lagios, V Sakkas. 2008. Continuous risk assessment of structures in areas of ground deformation susceptibility by persistent scatterers InSAR: Preliminary result of the Rio-Antirio bridge (Greece). Fringe 2007 Workshop "Advances in SAR Interferometry from Envisat and ERS Missions", Frascati, Italy.

Parekh I R. 1986. Comprehensive Bridge Posting Policy. Transportation Research Record 1083: 35-45.

Park J H, J T Kim, R Yeon-Sun, J M Lee. 2007. Monitoring Cracks and Prestress-Loss in PSC Girder Bridges Using Vibration-based Damage Detection Techniques. Proc. of SPIE 6532: 65321V.

Park J H, R Tateishi, K Wikantika, J G Park. 1999. Potential of high resolution remotely sensed data for urban infrastructure monitoring. Proceedings of the 1999 IEEE International Geoscience and Remote Sensing Symposium, Hamburg, Ger. 2 (1999): 1137-1139.

Patricio M A and D Maravall. 2007. A novel generalization of the gray-scale histogram and its application to the automated visual measurement and inspection of wooden pallets. Image and Vision Computing 25: 805-816.

Pedersen P T, S Valsgård, D Olsen, S Spangenberg. 1993. Ship impacts: Bow collisions. International Journal of Impact Engineering 13(2): 163-187.

Perera S C. 1995. Integration of Remote Sensing Data with GIS Technology for the Acceleration of the Activities in National Mapping Agencies. Asian Conference on Remote Sensing.

Pieraccini M, G Luzi, D Mecatti, M Fratini, L Noferini, L Carissimi, G Franchioni, C Atzeni. 2004. Remote sensing of building structural displacements using a microwave interferometer with imaging capability. NDT & E International 37(7): 545-550.

Pieraccini M, L Noferini, D Mecatti, C Atzeni, G Teza, A Galgaro, N Zaltron. 2006. Integration of radar interferometry and laser scanning for remote monitoring of an urban site built on a sliding slope. IEEE Transactions on Geoscience and Remote Sensing 44(9): 2335-2342.

Pieraccini M, F Parrini, M Fratini, C Atzeni, P Spinelli, M Micheloni. 2007. Static and dynamic testing of bridges through microwave interferometry. NDT&E International 40: 208-214.

Pieraccini M, M Fratini, F Parrini, C Atzeni, G Bartoli. 2008. Interferometric radar vs. accelerometer for dynamic monitoring of large structures: An experimental comparison. NDT & E International 41(4): 258-264.

Pillai S U, D Menon. 2003. Reinforced concrete design. Tata McGraw-Hill. Delhi. 169-179.

Qiao P, M Yang, M S Ayman. 2004. Impact analysis of I-Lam sandwich system for over-height collision protection of highway bridges. Engineering Structures 26(7): 1003-1012.

Quiñones-Rozo C A, Y M A Hashash, L Y Liu. 2008. Digital image reasoning for tracking excavation activities. Automation in Construction 17(5): 608-622.

Ramey G E, A R Wolff, R L Wright. 1997. DOT management actions to enhance bridge durability/longevity. Practice Periodical on Structural Design and Construction 2(3): 125-130.

Ribarsky W, E Hauser, S E Chen, W Tolone, S W Lee, R Chang, W Liu, R Vatcha, X Wang. 2009. Integrated Remote Sensing and Visualization (IRSV) System for Transportation Infrastructure Operations and Management. Poster Presentation, Transportation Research Board Annual Meeting, Washington D.C.

Righiniotis T D. 2004. Simplified calculations involving the maximum load on bridge fatigue details under inspection. Part I: Fracture. Journal of Constructional Steel Research 60: 809-824.

Rizzo P, I Bartoli, F L Scalea, S Coccia, M Fateh. 2005. High-speed defect detection in rails by non-contact guided ultrasonic testing. Health Monitoring and Smart Nondestructive Evaluation of Structural and Biological Systems IV San Diego, Calif., USA: 274-284.

Roberts G W, C J Brown, X Meng, P R B Dallard. 2007. Using GPS to measure the deflections and frequency responses of the London Millennium bridge. Bridge Design, Construction and Maintenance—Proceedings of the two-day International Conference organized by the Institution of Civil Engineers, ICE, Beijing, China: 487-496.

Roberts G W, X L Meng, M Meo, A Dodson, E Cosser, E Iuliano, A Morris. 2003. A remote bridge health monitoring system using computational simulation and GPS sensor data. Proceedings of the 11th FIG Symposium on Deformation Measurements, Santorini, Greece.

Roberts R L. 2004. Determining the depth of reinforcing bars in a concrete structure using electromagnetic signals. U.S. Pat. No. 6,772,091.

Rodriguez-Valverde M A, P Ramon-Torregrosa, A Paez-Duenas, M A Cabrerizo-Vilchez, R Hidalgo-Alvarez. 2008. Imaging Techniques Applied to Characterize Bitumen and Bituminous Emulsions. Advances in Colloid and Interface Science 136: 93-108.

Rolander D D, B M Phares, B A Graybeal, M E Moore, G A Washer. 2001. Highway Bridge Inspection State-of-the-Practice Survey. Transportation Research Record N1794: 73-81.

Roper W E and S Dutta. 2006. Oil Spill and Pipeline Condition Assessment Using Remote Sensing and Data Visualization. Sixth Biennial Fresh Water Spill Symposium, Portland, Oreg.

Rosati G, G Boschetti, A Biondi, A Rossi. 2009. Real-time defect detection on highly reflective curved surfaces. Optics and Lasers in Engineering 47(3-4): 379-384.

Ryu H K, Y J Kim, S P Chang. 2007. Crack control of a continuous composite two-girder bridge with prefabricated slabs under static and fatigue loads. Engineer Structures 29(6): 851-864.

Sabins F F. 1997. Remote Sensing: Principles and Interpretation. New York: W. H. Freeman & Co. Price: xiii+494.

Sakagami T, S Kubo, S Nakamura, Y Kawashima, T Komiyama. 2002. Application of lock-in data processing for thermographic NDT of concrete structures. Proceedings of SPIE 4710: 552-7.

Sasmal S and K Ramanjaneyulu. 2008. Condition evaluation of existing reinforced concrete bridges using fuzzy based analytic hierarchy approach. Expert Systems with Applications 35(3): 1430-1443.

Saxena A. 2001. Monitoring of urban infrastructure in cities and its fringe areas through remote sensing. Proceeding of the 22nd Asian Conference on Remote Sensing, Singapore.

Scheer J. 2000. Versagen von Bauwerken, Band 1: Brücken, Ernst & Sohn, Berlin.

Schulz K, E Cadario, H Gross, H Hammer, A Thiele, U Thoennessen, U Soergel, D Weydahl. 2007. Detection and feature extraction of bridges in airborne and spaceborne SAR image data. Proceedings of SPIE 6749: 67490U.

Senthilvasan J, D P Thambiratnam, G H Brameld. 2002. Dynamic response of a curved bridge under moving truck load. Engineer Structures 24(10): 1283-1293.

Sgrenzaroli M. 2005. Cultural heritage 3D reconstruction using high resolution laser scanner: new frontiers data processing. CIPA 2005 XX International Symposium, Torino, Italy.

Sharma H, S Hurlebaus, P Gardoni. 2008. Development of a bridge bumper to protect bridge girders from overheight vehicle impacts. Computer-Aided Civil and Infrastructure Engineering 23: 415-426.

Shin H and DA Grivas. 2003. How Accurate Is Ground-Penetrating Radar for Bridge Deck Condition Assessment? Transportation Research Record 1845: 139-147.

Shinozuka M and K Loh. 2004. Remote Sensing with the Synthetic Aperture Radar (SAR) for Urban Damage Detection. Proceedings of the Ninth Biennial ASCE Aerospace Division International Conference on Engineering, Construction, and Operations in Challenging Environments, League City/Houston, Tex.

Shrive N G. 2005. Intelligent Structural Health Monitoring: A civil engineering perspective. IEEE International Conference on Systems, Man and Cybernetics, Waikoloa, Hi., United States IEEE.

Simonetto E and H Oriot. 1999. 3D extraction from airborne SAR imagery. Proceedings of the 1999 Remote Sensing for Earth Science, Ocean, and Sea Ice Applications, Florence, Italy SPIE.

Sivakumar B, F Moses, G Fu, M Ghosn. 2007. Legal truck loads and AASHTO legal loads for posting. Transportation Research Board 575: 82.

Soergel U, A Thiele, H Gross, U Thoennessen. 2007. Extraction of bridge features from high-resolution InSAR data and optical images. Urban Remote Sensing Joint Event, Paris, France.

Stewart M G. 2001. Reliability-based assessment of ageing bridges using risk ranking and life cycle cost decision analyses. Reliability Engineering & System Safety 74(3): 263-273.

Stoeckeler E G. 1970. Use of aerial color photography for pavement evaluation studies. Highway Res. Record 319: 40-57.

Stramondo S, C Bignami, M Chini, N Pierdicca, A Tertulliani. 2006. Satellite radar and optical remote sensing for earthquake damage detection: results from different case studies. International Journal of Remote Sensing 27: 4433-4447.

Tarchi D, H Rudolf, M Pieraccini, C Atzeni. 2000. Remote monitoring of buildings using a ground-based SAR: Application to cultural heritage survey. International Journal of Remote Sensing 21(18): 3545-3551.

Teza G, A Galgaro, F Moro. 2009. Contactless recognition of concrete surface damage from laser scanning and curvature computation. NDT&E International 42: 240-249.

Thompson P D and J O Sobanjo. 2003. Florida DOT project-level bridge management models. Journal of Bridge Engineering 8(6): 345-352.

TRB. 2000. Conference: Remote Sensing for Transportation. Transportation Research Board, Washington, D.C. <http://onlinepubs.trb.org/Onlinepubs/conf/reports/remote_sensing_1.pdf>. (Accessed Nov. 6, 2009).

Tralli D M, R G Blom, V Zlotnicki, A Donnellan, D L Evans. 2005. Satellite remote sensing of earthquake, volcano, flood, landslide and coastal inundation hazards. ISPRS Journal of Photogrammetry and Remote Sensing 59(4): 185-198.

Tsai M Y, Y C Chen, S W R Lee. 2008. Correlation between Measurement and Simulation of Thermal Warpage in PBGA With Consideration of Molding Compound Residual Strain. Components and Packaging Technologies, IEEE Transactions on 31(3): 683-690.

Uddin W. 2002. Evaluation of airborne LiDAR digital terrain mapping for highway corridor planning and design. Pecora 15/Land Satellite information IV/ISPRS Commission I/FIEOS, American Society for Photogrammetry & Remote Sensing, Denver.

University of Cambridge. Bridge failure database. <http://www.bridgeforum.com/dir/collapse/type/unknown.html>. (Accessed Nov. 6, 2009).

US Census Bureau. 2000. North Carolina County—Population, Housing Units, Area, and Density. <http://factfinder.census.gov/servlet/GCTTable?ds_name=DEC_2000_SF1_U&geo_id=04000U S37&_box_head_nbr=GCT-PH1&format=ST-2>. (Accessed Nov. 6, 2009).

UTC. 2001. 4th National Transportation Asset Management Workshop. Midwest Regional University Transportation Center, Madison, Wis. <http://www.mrutc.org/outreach/workshop/program/>. (Accessed Nov. 6, 2009).

Wang L, L Yang, D Huang, Z Zhang, G Chen. 2008. An impact dynamics analysis on a new crashworthy device against ship-bridge collision. International Journal of Impact Engineering 35(8): 895-904.

Wang M L, G Heo, D Satpathi. 1997. Dynamic characterization of a long span bridge: A finite element based approach. Soil Dynamics and Earthquake Engineering 16(7-8): 503-512.

Washer G A. 1998. Developments for the non-destructive evaluation of highway bridges in the USA. NDT & E International 31(4): 245-9.

Washer G A, R Fenwick, N Bolleni, J Harper, S Alampalli. 2008. Thermal Imaging for Bridge Inspection and Maintenance. Tenth International Conference on Bridge and Structure Management, Transportation Research Board.

Wasserman E and H Pate. 2000. Tennessee's experience with high performance steel: an owner's prospective. Steel Bridge Design and Construction for the new Millennium with Emphasis on High Performance Steel: Conference Proceedings, Lincoln, Nebr., National Bridge Research Organization: 138-145.

Weil G J. 1998. Remote sensing of voids in large concrete structures: Runways, taxiways, roads, bridges, & building walls & roofs. Proceedings of SPIE—The International Society for Optical Engineering 3436(n1): 305-316.

Welch R. 1974. Skylab-2 Photo Evaluation. Photogrammetric Engineering and Remote Sensing 40: 1221-1224.

Welch R. 1976. Skylab S-190B ETC Photo Quality. Photogrammetric Engineering and Remote Sensing 42: 1057-1060.

Welch R. 1982. Spatial resolution requirements for urban studies. International Journal of Remote Sensing 3(2): 139-146.

Wong K Y, K L Man, W Y Chan. 2001. Application of global position system to structural health monitoring of cable-supported bridges. Proc. SPIE 4337: 390.

Wu F. 2005. Recognition of bridges by integrating satellite SAR and optical imagery. 2005 IEEE International Geoscience and Remote Sensing Symposium, Seoul, Korea, Republic of: 3939-3941.

Yang Y, H Ma, V Song. 2006. Automated targets detection based on level set evolution using radar and optical imagery. Geoinformatics 2006: Remotely Sensed Data and Information, Wuhan, China.

Yao L, P Yao, R Wang, X Meng. 2008. GPS-based dynamic monitoring and analysis of Nanpu bridge deformation. Journal of Tongji University 36(12): 1633-1636+1664.

Yehia S, O Abudayyeh, I Abdel-Qader, A Zalt. 2008. Ground-penetrating radar, chain drag, and ground truth: Correlation of bridge deck assessment data. Transportation Research Record 2044: 39-50.

Yelf R and A Carse. 2000. Audit of a road bridge superstructure using ground penetrating radar. The 8th International Conference on Ground Penetrating Radar, Goldcoast: 249-254.

Zhang R and E Aktan. 2005. Design considerations for sensing system to ensure data quality. Sensing Issues in Civil Structure Health Monitoring: 281-290.

Zhao Z and C Chen. 2001. Concrete bridge deterioration diagnosis using fuzzy inference system. Advances in Engineering Software 32(4).

The invention claimed is:

1. A computer method of inspecting a structure, comprising:
   flying a fixed-wing aircraft over the structure at an altitude of between about 500 feet and 1500 feet above ground level;

capturing a plurality of images of the structure using a small format digital camera being transported by the aircraft, wherein each of the images have a ground resolution of not greater than one inch;

associating each of the plurality of images with unique global positioning system data;

providing a computer configured for processing the images;

spatially integrating the plurality of images into a composite image using the computer; and analyzing the composite image to identify structural defects using the computer;

marking the identified structural defects, including by altering the appearance of the structural defects.

2. The method of claim 1, wherein the step of spatially integrating the plurality of images into a composite image using the computer comprises processing the plurality of images using a global information system application executed by the computer.

3. The method of claim 1, wherein the step of analyzing the composite image to identify structural defects using the computer comprises automatically identifying cracks, spalls, potholes, expanded joints, areas of delamination, efflourescence, mineralization, stressed regions, and/or collision damage.

4. The method of claim 1, wherein the step of analyzing the composite image to identify structural defects using the computer comprises the following steps:

loading the composite image into a computer software application adapted for image processing;

setting a tolerance value;

selecting a portion of the composite image to analyze;

converting the portion of the composite image to grayscale;

removing shadow regions from the portion of the composite image;

identifying the lowest pixel value corresponding to the structural defect;

associating with the structural defect all pixels within a predetermined bandwidth range of the lowest pixel value; and marking all pixels associated with the structural defect.

5. A computerized method of inspecting a structure, comprising:

creating a plurality of still images of the structure using fixed-wing-aircraft-based aerial photography, wherein each of the still images of the structure have a ground resolution of not greater than on inch;

providing a computer configured for processing the still images;

creating a composite image of the structure from a combination of the still images using the computer;

automatically marking structural defects of the structure on the composite image using the computer, including by altering the appearance of the structural defects;

automatically organizing the markings of the structural defects into image layers using the computer.

6. A computerized method according to claim 5, wherein respective image layers display each occurrence of a respective structural defect on the composite image.

* * * * *

UNITED STATES PATENT AND TRADEMARK OFFICE
CERTIFICATE OF CORRECTION

| | | |
|---|---|---|
| PATENT NO. | : 9,036,861 B2 | Page 1 of 1 |
| APPLICATION NO. | : 13/762864 | |
| DATED | : May 19, 2015 | |
| INVENTOR(S) | : Shen-En Chen et al. | |

It is certified that error appears in the above-identified patent and that said Letters Patent is hereby corrected as shown below:

In the Specification

Column 16, Line 49 reads: "quake. Earthquake Spectra 22(S1): 5147-5162."
and should read: "quake. Earthquake Spectra 22(S1): S147-S162."

In the Claims

Claim 1, Column 22, Line 63 reads: "A computer method of inspecting a structure, compris-"
should read: "A computerized method of inspecting a structure, compris-"

Claim 3, Column 23, Line 23 reads: "holes, expanded joints, areas of delamination, efflourescence,"
should read: "holes, expanded joints, areas of delamination, efflorescence,"

Claim 5, Column 24, Line 16 reads: "resolution of not greater than on inch;"
should read: "resolution of not greater than one inch;"

Signed and Sealed this
Fifteenth Day of March, 2016

Michelle K. Lee
*Director of the United States Patent and Trademark Office*